US012778335B2

(12) United States Patent
Parrini et al.

(10) Patent No.: US 12,778,335 B2
(45) Date of Patent: Nov. 3, 2026

(54) ELECTRIC ESPRESSO COFFEE MACHINE EQUIPPED AND CONCEIVED TO ALSO DISPENSE AMERICAN COFFEE

(71) Applicant: SIMONELLI GROUP S.P.A., Belforte del Chienti (IT)

(72) Inventors: Mauro Parrini, Porto Sant'Elpidio (IT); Claudio Enrico Cingolani, Camerino (IT)

(*) Notice: Subject to any disclaimer, the term of this patent is extended or adjusted under 35 U.S.C. 154(b) by 1052 days.

(21) Appl. No.: 17/835,173

(22) Filed: Jun. 8, 2022

(65) Prior Publication Data

US 2022/0400888 A1 Dec. 22, 2022

(30) Foreign Application Priority Data

Jun. 22, 2021 (IT) ........................ 102021000016391

(51) Int. Cl.
*A47J 31/06* (2006.01)
*A47J 31/44* (2006.01)
*A47J 31/56* (2006.01)

(52) U.S. Cl.
CPC ....... *A47J 31/0657* (2013.01); *A47J 31/0621* (2013.01); *A47J 31/446* (2013.01); *A47J 31/56* (2013.01)

(58) Field of Classification Search
CPC .. A47J 31/0657; A47J 31/0621; A47J 31/446; A47J 31/56
USPC ........................................................... 99/299
See application file for complete search history.

(56) References Cited

U.S. PATENT DOCUMENTS

| | | | | |
|---|---|---|---|---|
| 3,824,914 A * | 7/1974 | Casiano | A47J 31/34 | 99/302 |
| 5,388,502 A * | 2/1995 | Hufnagl | A47J 31/24 | 99/295 |
| 7,654,191 B2 * | 2/2010 | Greenwald | A47J 31/00 | 99/275 |
| 2004/0244599 A1 * | 12/2004 | Wei | A47J 31/0673 | 99/290 |
| 2014/0069279 A1 * | 3/2014 | Upston | A47J 31/44 | 99/283 |
| 2022/0121197 A1 * | 4/2022 | Mercier | | 99/279 |

FOREIGN PATENT DOCUMENTS

EP 3659475 A1 6/2020

* cited by examiner

*Primary Examiner* — Topaz L. Elliott
*Assistant Examiner* — Solan Oliva
(74) *Attorney, Agent, or Firm* — Egbert, McDaniel & Swartz, PLLC

(57) ABSTRACT

Coffee machine having a water system in which pressurized hot water circulates, at least one dispensing unit fed with pressurized hot water, a first filter holder housing a first filter for the preparation of espresso coffee, a second filter for the preparation of American coffee, having a funnel-shaped basket which with an upper collar with a cylindrical shape, which is inferiorly joined with a conical hopper perforated with a plurality of holes.

5 Claims, 6 Drawing Sheets

ELECTRIC ESPRESSO COFFEE MACHINE EQUIPPED AND CONCEIVED TO ALSO DISPENSE AMERICAN COFFEE

CROSS-REFERENCE TO RELATED APPLICATIONS

Not applicable.

BACKGROUND OF THE INVENTION

1. Field of the Invention

The present invention relates to an electric espresso machine equipped and conceived to also dispense American coffee.

2. Description of Related Art Including Information Disclosed Under 37 CFR 1.97 and 37 CFR 1.98

There are differences in the preparation of espresso coffee with respect to American coffee. Espresso coffee is prepared by pouring pressurized hot water through a compact, pressed lump of roasted, finely ground coffee in order to obtain a thick, creamy beverage in a time of about thirty seconds. Espresso coffee is served in a small cup and has a high concentration level that gives a well-defined, strong and aromatic taste. On the other hand, American coffee, which is also known as filter coffee, is obtained by percolation, that is to say by pouring boiling water at atmospheric pressure through an appropriate amount of ground coffee contained in a filter, allowing the water to drip by gravity inside a receptacle placed under the filter.

An increasing demand for beverages made with coffee and milk has resulted in the design of an increasing number of dedicated machines in order to dispense each beverage with its features, while respecting specific preparation processes.

Evidently, the diversity of the machines and their presence in the same establishment entails not only higher purchase costs, but also problems in terms of availability and organization of the space, in view of the considerable overall dimensions of said machines. By way of example, although it can be used for the preparation of hot beverages, such as hot milk, with or without foam, or hot water for the preparation of hot drinks, such as teas or infusions, a conventional espresso coffee machine cannot be used for the preparation of American coffee (filter coffee). In fact, a conventional filter coffee machine uses hot water at atmospheric pressure, which percolates by gravity through the filter that contains uncompacted ground coffee. In contrast, in an espresso coffee machine, a pump provides for the hot water to be pressurized and conveyed into a dispensing unit wherein the filter holder is tightly engaged. The filter holder contains a dose of pressed coffee powder and the water passes through the coffee powder in a few seconds, precisely because of its high pressure, which is usually 9 bars.

Therefore, if a coffee shop wants to give customers the option of ordering both an espresso coffee and a filter coffee, two different machines, one for each type of beverage, must be provided.

EP3659475 discloses a coffee machine with a proportional pre-infusion system used to wet the coffee powder in the filter holder before the liquid coffee is dispensed.

BRIEF SUMMARY OF THE INVENTION

The purpose of the present invention is to equip and conceive a typical espresso coffee machine in such a way to also dispense American coffee.

Such a purpose has been achieved by the coffee machine according to the invention, the main features of which are pointed out in the attached independent claims.

Advantageous embodiments appear from the dependent claims.

The coffee machine according to the invention is characterized by the fact that it is equipped with two different types of filter holders:

- a first, completely traditional filter holder for the preparation of espresso coffee;
- a second, completely innovative filter holder for the preparation of American coffee.

The coffee machine according to the invention is also characterized in that it is equipped with a special water system and with a control unit that allow the hot water to flow slowly through said innovative filter holder for American coffee by simple gravity, thus implementing the percolation process at the base of the preparation of American coffee.

BRIEF DESCRIPTION OF THE SEVERAL VIEWS OF THE DRAWINGS

For the sake of explanatory clarity, the description of the coffee machine according to the invention continues with reference to the attached drawings, which are shown for illustrative and non-limiting purposes only, wherein.

DETAILED DESCRIPTION OF THE INVENTION

Figure 1:
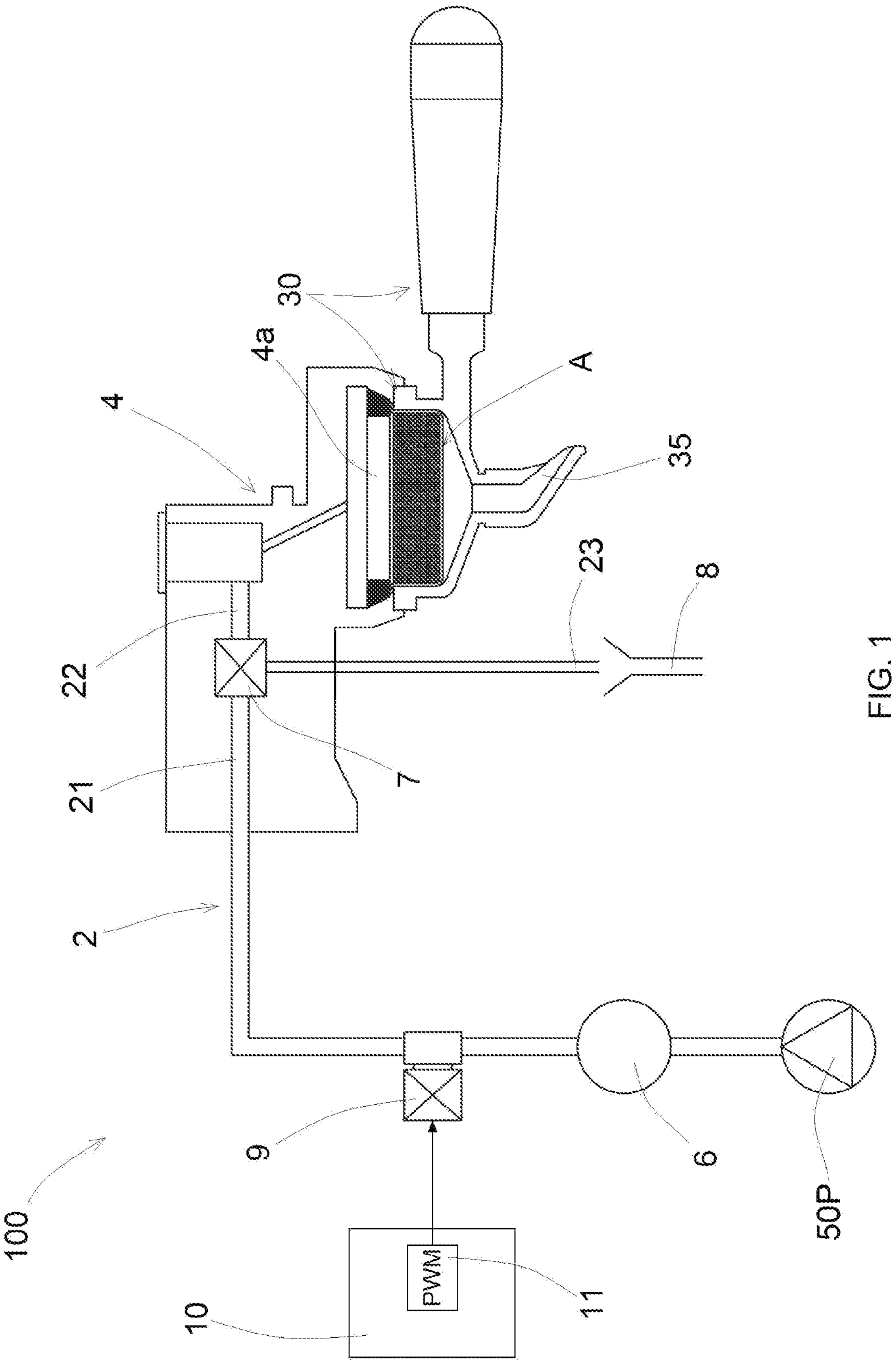
FIG. 1 is a schematic view of a system of the machine according to the invention, with a filter holder for espresso coffee.

As shown in FIG. 1, the coffee machine (100) according to the invention comprises:

- a water system (2) in which pressurized hot water circulates:
- at least one dispensing unit (4) fed with pressurized hot water.
- a first filter holder (30) for the preparation of espresso coffee.

The dispensing unit (4) comprises a dispensing mouth (4*a*) in which the first filter holder (30) is arranged.

Figure 2:
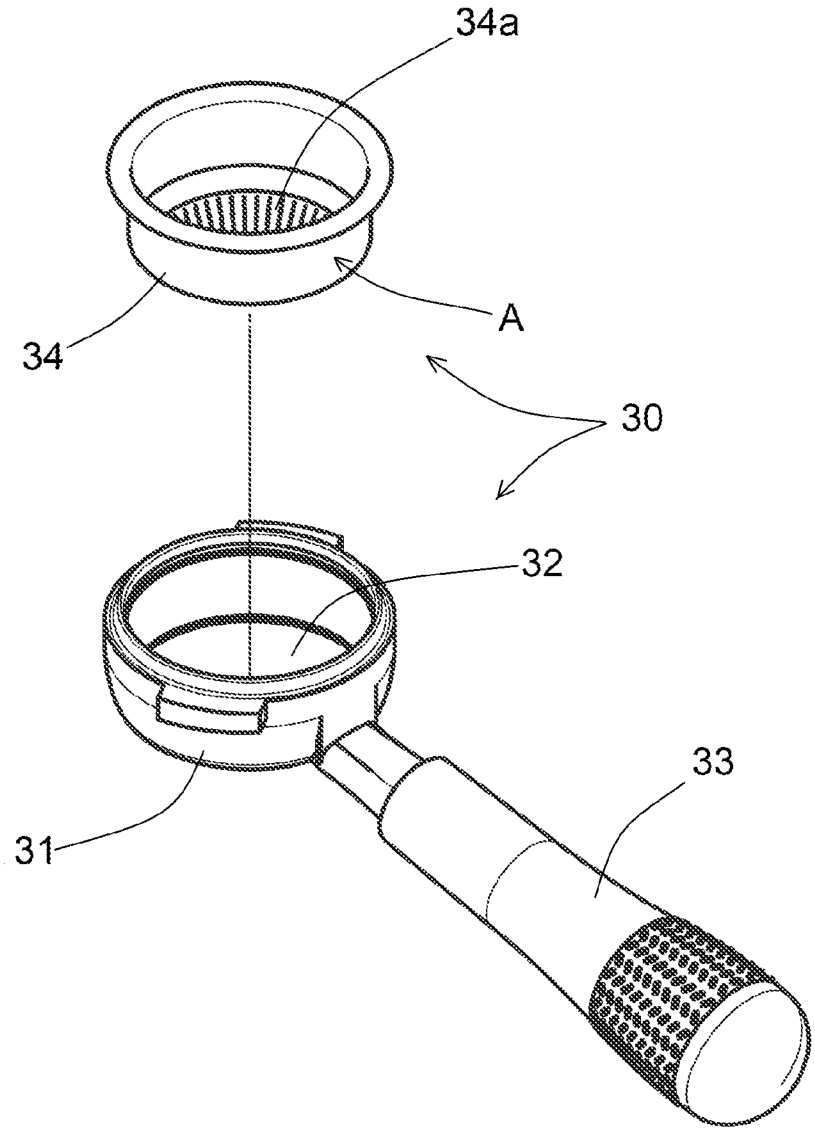
FIG. 2 is a perspective exploded view of a traditional filter holder for the preparation of espresso coffee.

Referring to FIG. 2, the first filter holder (30) comprises a body (31) having a seat (32) with circular shape. The body (31) of the filter holder is suitable for being coupled to the dispensing mouth (4*a*) of the dispensing unit (4) by means of bayonet coupling means.

A handle (33) protrudes externally from the body (31) of the filter holder. The handle (33) is manually held by the operator to facilitate the repeated manual operation that is carried out to engage and disengage the filter holder (30) with/from the dispensing unit (4).

The seat (32) of the filter holder houses a first filter (A) for the preparation of espresso coffee. The first filter (A) consists of a tub (34) with circular shape, which is suitable for receiving a compact dose of coffee powder.

One or more spouts (35) protrude inferiorly from the body (31) and communicate with the seat (32) of the filter holder.

The tub (34) of the first filter has a perforated bottom wall (34*a*) provided with a plurality of small holes suitable for holding the ground coffee powder while allowing water to pass through, in such a way that the beverage can be poured into a cup through the spout (35).

The water system (2) comprises a pump (50P) suitable for feeding pressurized water at a pressure of approximately 9 to 11 bar, generally from a reservoir (not shown in FIG. 1).

A heater (6) is arranged in the water system (2) between the pump (50P) and the dispensing unit (4). The heater (6) is suitable for heating the water to a temperature of approximately 88-96° C., that is to say to a suitable temperature for obtaining the beverage.

A dispensing valve (7) is arranged in the dispensing unit (4) to enable or disable the delivery of water from the water system (2) to said at least one dispensing unit (4).

The dispensing valve (7) is a three-way solenoid valve and is connected to three conduits:

- an inlet conduit (21) communicating with the water system (2),
- an outlet conduit (22) communicating with said at least dispensing unit (4), and
- a drain conduit (23) communicating with a drain (8).

While the beverage is being extracted, the dispensing valve (7) opens the communication between the inlet conduit (21) and the outlet conduit (22) and closes the communication to the drain conduit (23).

Once the beverage has been extracted, the dispensing valve (7) opens the communication between the outlet conduit (22) and the drain conduit (23) and closes the communication to the inlet conduit (21).

In this way, once the beverage has been extracted, the water remaining between the dose of coffee contained in said first filter (A) and the dispensing unit (4) is drained, in such a way as to eliminate the pressure in this area of the dispensing unit and remove the first filter holder (30), without any leaks of the high-pressure water from the water system (2).

The coffee machine (100) also comprises a control unit (10) in order to program and control the operation of the coffee machine (100).

The coffee machine (100) is characterized by the fact that it is equipped with a second filter holder (50) which is specifically conceived for the preparation of American coffee.

Figure 3:
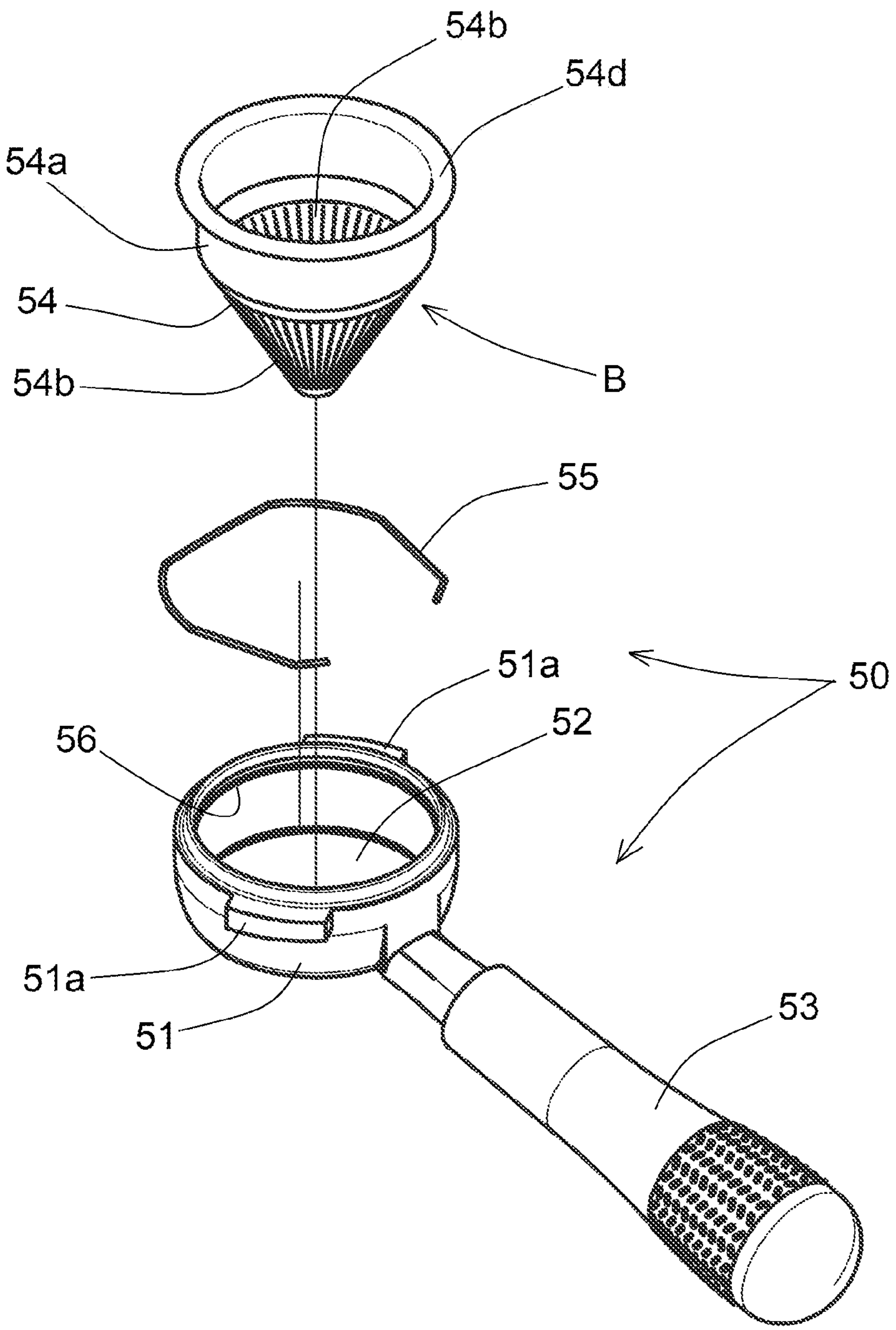
FIG. 3 is a perspective exploded view of an innovative filter holder for the preparation of American coffee.
Figure 4:
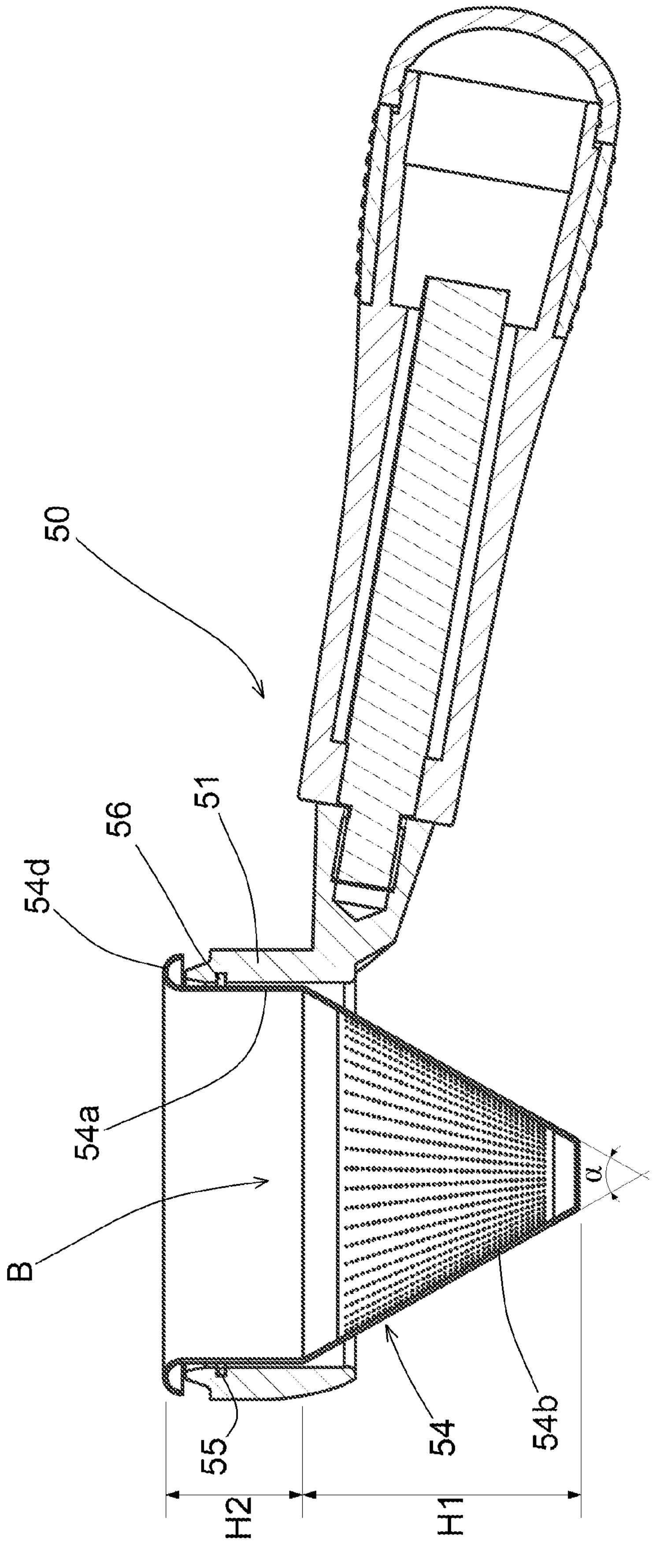
FIG. 4 is a sectional view of the filter holder of FIG. 3 in assembled condition.

Referring to FIGS. 3 and 4, the second filter holder (50) comprises an annular body (51) that defines a circular housing (52). Externally, the body (51) is dimensioned and shaped in such a way to be coupled to the dispensing mouth (4*a*) of the dispensing unit (4) by means of bayonet coupling means (51*a*).

A handle (53) protrudes externally from the body (51) of the second filter holder in order to facilitate the repeated manual operation that is carried out to engage and disengage the second filter holder (50) with/from the dispensing unit (4).

As shown in FIG. 3, the bayonet coupling means (51*a*) comprise two tabs that protrude radially from the body (51) of the second filter holder to provide a bayonet coupling between the second filter holder (50) and the dispensing mouth (4*a*) of the dispensing unit (4).

Said seat (52) of the second filter holder houses a second filter (B) for the preparation of American coffee. The second filter (B) consists of a funnel-shaped basket (54).

The basket (54) comprises an upper collar (54*a*) with cylindrical shape, which is joined with a lower hopper (54*b*) of conical shape.

Referring to FIG. 4, the lower hopper (54*b*) has a greater height than a height (H2) of the upper collar (54*a*) and a coning angle (α) lower than 90°.

Such a configuration increases the capacity of the basket (54). Indeed, it should be noted that the amount of coffee powder necessary to make an American coffee is much higher than the amount used to make an espresso coffee.

The upper collar (54*a*) is suitably dimensioned for being housed inside the seat (52) of the body (51) of the second filter holder. In this way, the lower hopper (54*b*) protrudes below the body (51) of the second filter holder. The lower hopper (54*b*) has perforated walls provided with a plurality of holes, as shown in FIG. 4.

Preferably, the hopper (54*b*) is made of two layers of filtering mesh, namely a perforated inner layer and a perforated outer layer. The inner layer of filtering mesh has smaller holes than the outer layer of filtering mesh. The holes of the inner layer preferably have a diameter of 75 μm. The holes of the outer layer preferably have a diameter of 0.3 mm.

A flange (54*d*) protrudes radially outwards from an opening of said upper collar (54*a*). The flange (54*d*) is rested on an edge of the annular body (51) when said second filter (B) is lowered inside the seat (52) of the second filter holder.

The seat (52) of the body of the second filter holder has an annular groove (56) to accommodate a retention spring (55) shaped like an open-ring wire. The retention spring (55) is suitable for tightening and holding the basket (54), as shown in FIG. 4.

The water system (2) and the control unit (10) let the hot water flow slowly through the second filter holder (50) for the preparation of American coffee by simple gravity, thus implementing the percolation process at the base of the preparation of American coffee.

The water system (2) is equipped with an infusion valve (9) disposed upstream the dispensing valve (7).

The infusion valve (9) is a two-way pulsing solenoid valve; otherwise said, such an infusion valve (9) has a shutter capable of opening and closing the communication between the two ways of the solenoid valve with an ON/OFF system, in a pulsed mode, with programmable opening and closing times.

The infusion valve (9) is connected to the control unit (10), in which switching means (11) are provided to open and close the infusion valve (9) with a pulse train (I) (FIG. 5) with suitable duration and frequency in order to implement said percolation process for the preparation of American coffee.

By way of example, the switching means (11) can be a relay or a PWM (pulse-width modulation) power supply.

The intermittent opening and closing of the infusion valve (9) allows the dispensing unit (4) to be fed with a pulsating water flow rate.

Figure 6:
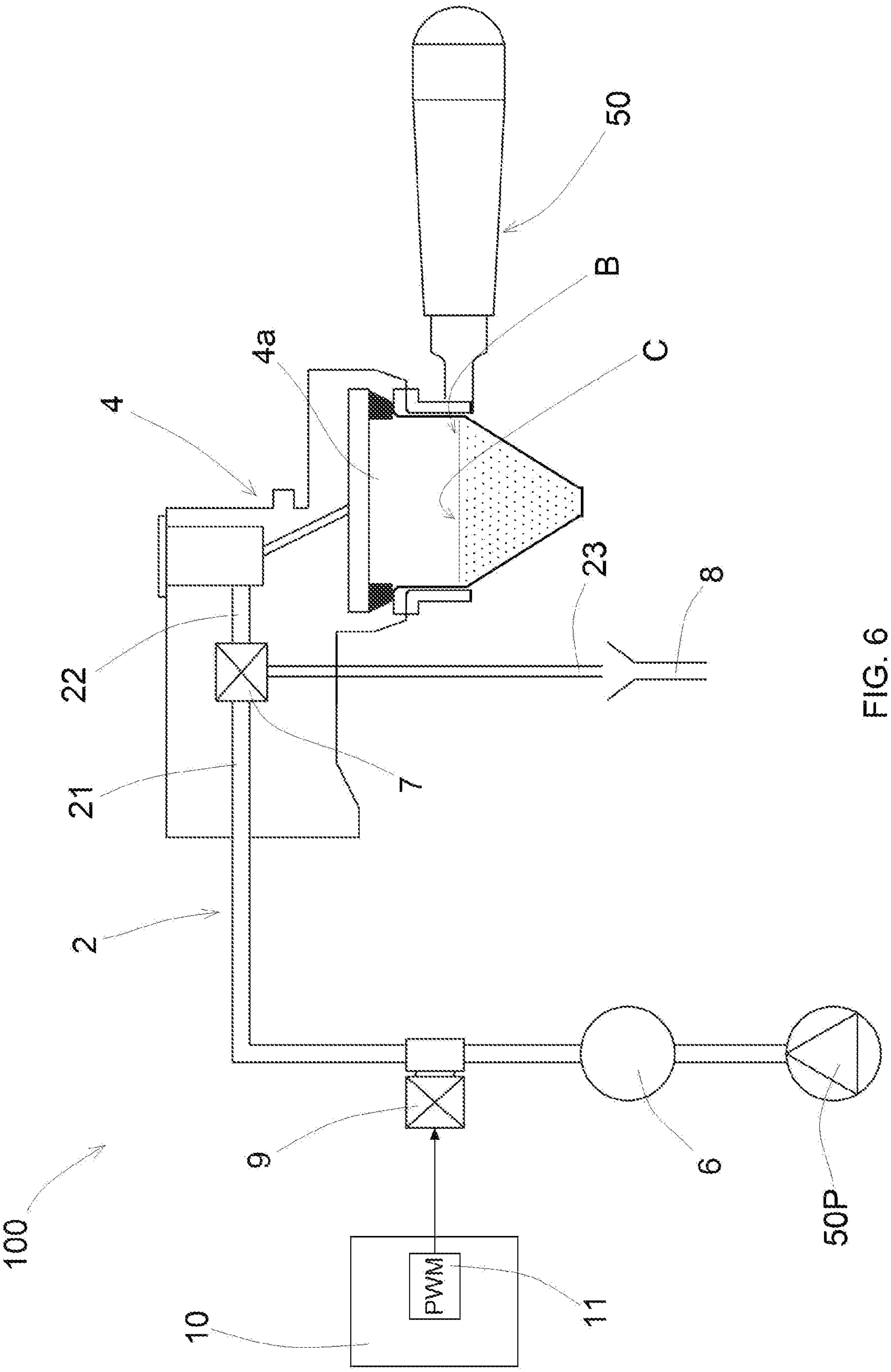
FIG. 6 is a schematic view illustrating a system of the coffee machine according to the invention, with a filter holder for American coffee.

Referring to FIG. 6, when the second filter holder (50) is coupled to the dispensing unit (4), a chamber (C) is formed between the second filter (B) and the dispensing unit (4), which contains the coffee powder suitable for preparing the American coffee. Since the coffee powder is not compressed in the second filter (B), there is a volume of air between the coffee powder grains in the chamber Ⓒ.

To prevent the creation of a pressure higher than atmospheric pressure in the chamber (C), the volume of water fed into chamber (C) each time must be lower than the volume of air in the chamber (C). Such a volume of water can be adjusted according to the time in which the infusion valve (9) remains open.

When the second filter holder (50) is tightly engaged on the dispensing unit (4) and a button for dispensing American coffee is pushed, the control unit (10) imposes an operating mode on the coffee machine (100) according to which the dispensing unit (4) is fed with intermittent water jet. During the dispensing of each jet of water, the volume of water that reaches the dispensing unit (4) is not sufficient to cause an increase in pressure in the chamber (C). Therefore, the water is fed from the dispensing unit (4) to the coffee contained in the basket (54) of the second filter holder at a pressure that is basically equal to the atmospheric pressure.

The time interval between two successive jets of water must be long enough for the amount of water dispensed during a previous jet of water to percolate completely through the coffee powder contained in the basket (54) by simple gravity.

The jets of water are repeated cyclically until the desired dose of beverage has completely percolated into the cup disposed under the dispensing unit (4) wherein the second filter holder (50) is engaged.

Figure 5:
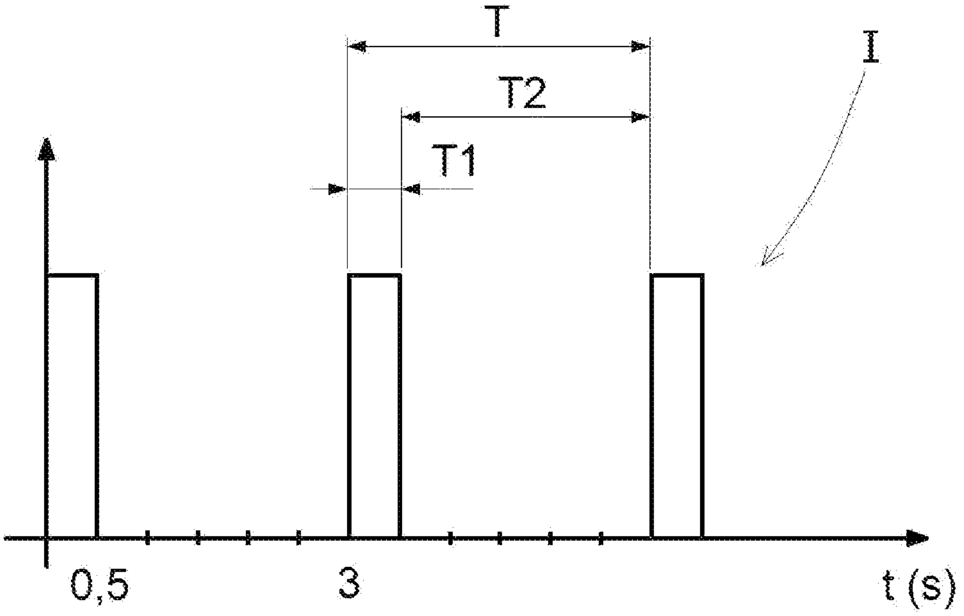
FIG. 5 is a Cartesian diagram illustrating a pulse train for controlling the infusion solenoid valve of the coffee machine according to the invention.

The pulse train (I) in FIG. 5 shows pulses having a duration equal to the opening time interval (T1) in which the infusion valve is open and a distance between pulses equal to the closing time interval (T2) in which the infusion valve is closed.

The pulse train (I) comprises:

pulses having a duration equal to the opening time interval (T1), a period (T=T1+T2) equal to the sum of the opening time interval (T1) and the closing time interval (T2); and a frequency (f=1/T) equal to the inverse of the period.

In this way:

a variation in the duration of the pulse will vary the volume of water in a jet of water, a variation in the frequency of the pulse train (I) will vary the closing time intervals (T2) in which the dispensing valve remains closed to allow the percolation of water coming from the preceding jet of water, and a variation in the number of pulses will vary the total amount of dispensed beverage.

Experimentally, it was verified that the volume of air contained in the chamber (C) is greater than 3 $cm^3$.

Therefore, the opening time interval (T1) in which the infusion valve is to remain open must be such to allow the passage of a volume of water that is lower than or equal to 3 $cm^3$. In such a case, the opening time interval (T1) in which the infusion valve is to remain open is lower than or equal to 0.5 seconds.

A volume of water of 3 $cm^3$ takes less than 2.5 seconds to percolate through the coffee powder contained in the second filter (B). Therefore, each closing time interval (T2) in which the infusion valve remains closed must be higher than or equal to 2.5 seconds.

In the case where a volume of 120 $cm^3$ of American coffee is to be dispensed, it will be necessary to send 40 jets of water to the filter holder (50), each jet of water containing 3 cc of water. If the open time intervals (T1), in which the infusion valve is open, have a duration of 0.5 seconds and the closing time intervals (T2), in which the infusion valve is closed, have a duration of 2.5 seconds, 120 seconds will be required for dispensing 120 $cm^3$ of American coffee.

It should be noted that the dispensing valve (7) remains open for the time necessary to complete the number of intermittent jets of water that are programmed in order to pour a desired dose of American coffee into the cup.

The control unit (10) also comprises a memory and programming unit in which the number of pulses of the pulse train (I), the duration of each pulse, and the frequency of the pulse train can be set.

When the first filter holder (30) is tightly engaged on the dispensing unit (4) and the button for the preparation of an espresso coffee is operated, said control unit (10) imposes an operating mode on the coffee machine (100) according to which the infusion valve (9) remains open for the entire opening time of the dispensing valve (7), whereby the dispensing unit (4) is supplied, for the entire programmed time, with a continuous flow of hot water that passes through said first filter (A) under pressure.

In order to make an espresso coffee, the following steps must be implemented:

engaging the first filter holder (30) on a dispensing unit (4) after filling said first filter (A) with coffee powder;

opening the dispensing valve (7);

keeping the dispensing valve (9) open for the entire opening time of the dispensing valve (7);

closing the dispensing valve (7) when the beverage has been dispensed.

In order to make an American coffee, the following steps must be implemented:

engaging the second filter holder (50) on a dispensing unit (4) after filling the second filter (B) with coffee powder;

opening the dispensing valve (7);

opening and closing the infusion valve (9) intermittently and in such a way that the volume of water that is poured into the second filter (B)—at each opening time interval of the infusion valve (9)—is lower than the volume of air contained in the mass of coffee powder and in the chamber defined by the dispensing unit (4) and by the second filter (B), and the time interval between two successive openings of the infusion valve (9) is long enough for the amount of water dispensed during the previous opening time interval to percolate completely through the basket (54);

closing the dispensing valve (7) when a full dose of beverage has been dispensed, that is to say, when the programmed number of opening and closing time intervals of the infusion valve (9) has been implemented.

The coffee machine (100) according to the invention may comprise several dispensing units (4) and provides that at least one of said dispensing units is dedicated to the preparation of American coffee and is fed with water at a lower temperature than the other dispensing units dedicated to the preparation of espresso coffee.

In fact, it should be noted hot water at a temperature of approximately 92° C. and at a pressure of usually of 9 bar is used for espresso coffee, whereas hot water at atmospheric pressure at a temperature of approximately 88° C. is preferably used for American coffee.

We claim:

1. A coffee machine comprising:

a water system adapted to circulate pressurized hot water;

at least one dispensing unit having a delivery mouth, said at least one dispensing unit adapted to be supplied with the pressurized hot water;

a first filter holder configured to be tightly coupled to the delivery mouth of said at least one dispensing unit, the first filter holder having a handle substantially protruding from an exterior surface of the first filter holder, said first filter holder housing a first filter adapted to prepare espresso coffee, the first filter forming a circular tub with a bottom wall, the bottom wall being perforated with small holes;

a dispensing valve cooperative with said at least one dispensing unit and adapted to enable or disable a delivery of the pressurized hot water to said at least one dispensing unit;

an infusion valve disposed upstream of said dispensing valve, said infusion valve being an on-off valve;

a control unit connected to said water system and to said dispensing valve and to said infusion valve, said control unit adapted to control an operation of the coffee machine; and a second filter holder that houses a second filter, the second filter holder having a handle substantially protruding from an exterior surface of the second filter holder, the second filter adapted to contain coffee powder for preparation of American coffee, the second filter having a basket with an upper collar, the upper collar having a cylindrical shape, a bottom of the upper collar being joined with a conical hopper perforated with a plurality of small holes, wherein said second filter holder is configured to be tightly coupled to the delivery mouth of said at least one dispensing unit so as to define a chamber between the second filter and said at least one dispensing unit, the chamber containing the coffee powder, wherein said infusion valve is controlled by said control unit in accordance of one of a first operating mode and a second operating mode, the first operating mode being for making the espresso coffee in which the first filter holder is coupled to the at least one dispensing unit, said infusion valve being open during an entire operating time of the dispensing valve in the first operating mode so as to dispense the espresso coffee through said first filter holder, wherein the second operating mode is for making the American coffee, the second filter holder being coupled to said at least one dispensing unit in the second operating mode, said infusion valve being intermittently opened and closed such that at every opening time interval of said infusion valve a volume of water poured into the second filter is less than a volume of air contained in the chamber between the second filter and said at least one dispensing unit, wherein during every closing time interval of said infusion valve the amount of water dispensed during the preceding opening time interval is sufficient to percolate completely through the second filter.

2. The coffee machine of claim 1, wherein said control unit has a switch controlling said infusion valve with a pulse train, the pulse train having a number of pulses.

3. The coffee machine of claim 1, wherein said second filter holder comprises an annular body that defines a circular seat, the basket being housed in the seat.

4. The coffee machine of claim 1, wherein each of the first filter holder and second filter holder are engaged and disengaged from the delivery mouth of the at least one dispensing unit by rotation.

5. The coffee machine of claim 4, wherein each of the first filter holder and second filter holder comprise bayonet coupling means for coupling with the delivery mouth of the at least one dispensing unit.

* * * * *